US011200794B2

(12) United States Patent
Pederson (10) Patent No.: US 11,200,794 B2
(45) Date of Patent: *Dec. 14, 2021

(54) FUNCTION DISABLER DEVICE AND SYSTEM

(71) Applicant: Federal Law Enforcement Development Services, Inc., St. Cloud, MN (US)

(72) Inventor: Felicity-John Cunanan Pederson, Merritt Island, FL (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,785

(22) Filed: Feb. 23, 2021

(65) Prior Publication Data

US 2021/0176836 A1    Jun. 10, 2021

Related U.S. Application Data

(63) Continuation of application No. 16/601,183, filed on Oct. 14, 2019, now Pat. No. 10,932,337, which is a
(Continued)

(51) Int. Cl.
*G08C 23/04* (2006.01)
*H04B 10/116* (2013.01)
(Continued)

(52) U.S. Cl.
CPC ........... *G08C 23/04* (2013.01); *H04B 10/116* (2013.01); *H05B 45/10* (2020.01); *H05B 45/20* (2020.01);
(Continued)

(58) Field of Classification Search
None
See application file for complete search history.

(56) References Cited

U.S. PATENT DOCUMENTS 700,678 A    5/1902   Downie
2,082,279 A    6/1937   Fore
(Continued)

FOREIGN PATENT DOCUMENTS

AU    2006201345    10/2007
AU    2007202909     2/2008
(Continued)

OTHER PUBLICATIONS

Komine T. et al., "Integrated System of White LED Visible-Light Communicaiton and Power-Line Communication," Sep. 15, 2002; Sep. 15, 2002-Sep. 18, 2002, vol. 4, Sep. 15, 2002, pp. 1762-1766.
(Continued)

*Primary Examiner* — David W Lambert
(74) *Attorney, Agent, or Firm* — Edwin E. Voigt, II (57) ABSTRACT

A function disabler system includes a personal electronic device having at least one component such as a camera, and a processor having pulsed light communication software enabling receipt and transmission of pulsed light communication signals. The processor additionally includes a hosting customer software application, where the personal electronic device receives at least one pulsed light communication signal within a designated area and the pulsed light communication signal includes an instruction signal which instructs the hosting customer software application to disable the at least one component when the personal electronic device is positioned in the designated area.

12 Claims, 2 Drawing Sheets

Related U.S. Application Data continuation of application No. 16/210,546, filed on Dec. 5, 2018, now Pat. No. 10,448,472, which is a continuation of application No. 15/233,282, filed on Aug. 10, 2016, now abandoned.

(60) Provisional application No. 62/203,697, filed on Aug. 11, 2015.

(51) Int. Cl.
*H05B 45/20* (2020.01)
*H05B 47/11* (2020.01)
*H05B 47/19* (2020.01)
*H05B 47/105* (2020.01)
*H05B 47/155* (2020.01)
*H05B 45/10* (2020.01)
*H05B 47/115* (2020.01)
*H05B 45/18* (2020.01)

(52) U.S. Cl.
CPC .......... *H05B 47/105* (2020.01); *H05B 47/11* (2020.01); *H05B 47/155* (2020.01); *H05B 47/19* (2020.01); *H05B 45/18* (2020.01); *H05B 47/115* (2020.01)

(56) References Cited

U.S. PATENT DOCUMENTS

| | | |
|---|---|---|
| 3,469,686 A | 9/1969 | Gutsche et al. |
| 3,696,384 A | 10/1972 | Lester |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,732,310 A | 3/1988 | Umeha |
| 4,742,432 A | 5/1988 | Thillays |
| 4,785,463 A | 11/1988 | Janc |
| 4,799,135 A | 1/1989 | Inukai |
| 4,821,118 A | 4/1989 | Lafreniere |
| 4,821,338 A | 4/1989 | Naruse |
| 4,848,923 A | 7/1989 | Ziegler |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,099,346 A | 3/1992 | Lee |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | Vandulmen |
| 5,245,681 A | 9/1993 | Guignard |
| 5,247,380 A | 9/1993 | Lee |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |

(56) References Cited

U.S. PATENT DOCUMENTS

| | | |
|---|---|---|
| 5,491,350 A | 2/1996 | Unno |
| 5,495,358 A | 2/1996 | Bartig |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,566,022 A | 10/1996 | Segev |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | Deplaen |
| 5,612,231 A | 3/1997 | Holm |
| 5,619,373 A | 4/1997 | Meyerhofer |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | Vannrox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,710,833 A | 1/1998 | Moghaddam |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,737,060 A | 4/1998 | Kasha, Jr. |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,783,909 A | 7/1998 | Hochstein |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,818,421 A | 10/1998 | Ogino |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,116 A | 11/1998 | Katyl |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,064,303 A | 5/2000 | Klein |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,084,555 A | 7/2000 | Mizoguchi |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,097,543 A | 8/2000 | Rallison |
| 6,102,696 A | 8/2000 | Osterwalder |
| 6,104,107 A | 8/2000 | Avramenko |
| 6,106,137 A | 8/2000 | Adams |
| 6,107,918 A | 8/2000 | Klein |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,137,613 A | 10/2000 | Ushirozawa |
| 6,159,005 A | 12/2000 | Herold |
| 6,160,666 A | 12/2000 | Rallison |
| 6,166,496 A | 12/2000 | Lys |
| 6,177,678 B1 | 1/2001 | Brass |
| 6,181,805 B1 | 1/2001 | Koike |
| 6,183,100 B1 | 2/2001 | Suckow |
| 6,188,738 B1 | 2/2001 | Sakamoto |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |

(56) References Cited

U.S. PATENT DOCUMENTS

| | | |
|---|---|---|
| 6,271,815 B1 | 8/2001 | Yang |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,426,599 B1 | 7/2002 | Leeb |
| 6,452,572 B1 | 9/2002 | Fan |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,504,646 B1 | 1/2003 | Amoruso |
| 6,532,212 B1 | 3/2003 | Soloway |
| 6,547,410 B1 | 4/2003 | Pederson |
| 6,548,967 B1 | 4/2003 | Dowling |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,816,132 B2 | 11/2004 | Tanijiri |
| 6,819,654 B2 | 11/2004 | Way |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,006,768 B1 | 2/2006 | Franklin |
| 7,009,471 B2 | 3/2006 | Elmore |
| 7,023,469 B1 | 4/2006 | Olson |
| 7,046,160 B2 | 5/2006 | Pederson |
| 7,062,797 B2 | 6/2006 | Khulusi |
| 7,072,587 B2 | 7/2006 | Dietz |
| 7,102,665 B1 | 9/2006 | Chandler |
| 7,103,614 B1 | 9/2006 | Kucik |
| 7,178,941 B2 | 2/2007 | Roberge |
| 7,183,895 B2 | 2/2007 | Bazakos |
| 7,190,125 B2 | 3/2007 | McDonough |
| 7,224,326 B2 | 5/2007 | Sefton |
| 7,230,884 B2 | 6/2007 | Shemesh |
| 7,269,632 B2 | 9/2007 | Edeker |
| 7,289,731 B2 | 10/2007 | Thinguldstad |
| 7,309,965 B2 | 12/2007 | Dowling |
| 7,321,757 B2 | 1/2008 | Yamashita |
| 7,323,991 B1 | 1/2008 | Eckert |
| 7,324,757 B2 | 1/2008 | Wilson |
| 7,333,735 B1 | 2/2008 | Goorjian |
| 7,349,325 B2 | 3/2008 | Trzeciak |
| 7,352,972 B2 | 4/2008 | Franklin |
| 7,439,847 B2 | 10/2008 | Pederson |
| 7,439,874 B2 | 10/2008 | Sotiriou |
| 7,529,488 B2 | 5/2009 | Burdick |
| 7,548,698 B2 | 6/2009 | Yamamoto |
| 7,557,521 B2 | 7/2009 | Lys |
| 7,567,844 B2 | 7/2009 | Thomas |
| 7,570,246 B2 | 8/2009 | Maniam |
| 7,583,901 B2 | 9/2009 | Nakagawa |
| 7,607,798 B2 | 10/2009 | Panotopoulos |
| 7,689,130 B2 | 3/2010 | Ashdown |
| 7,715,723 B2 | 5/2010 | Kagawa |
| 7,912,377 B2 | 3/2011 | Koga |
| 7,940,191 B2 | 5/2011 | Hierzer |
| 8,019,229 B2 | 9/2011 | Fujiwara |
| 8,116,621 B2 | 2/2012 | King |
| 8,126,554 B2 | 2/2012 | Kane |
| 8,175,799 B1 | 5/2012 | Woehler |
| 8,188,878 B2 | 5/2012 | Pederson |
| 8,188,879 B2 | 5/2012 | Pederson |
| 8,207,821 B2 | 6/2012 | Roberge |
| 8,421,588 B1 | 4/2013 | Ross |
| 8,494,374 B2 | 7/2013 | Snyder |
| 8,538,692 B2 | 9/2013 | Wurman |
| 8,547,036 B2 | 10/2013 | Tran |
| 8,571,411 B2 | 10/2013 | Pederson |
| 8,593,299 B2 | 11/2013 | Pederson |
| 8,687,965 B2 | 4/2014 | Pederson |
| 8,729,833 B2 | 5/2014 | Chemel |
| 8,744,267 B2 | 6/2014 | Pederson |
| 8,789,191 B2 | 7/2014 | Bhagwat |
| 8,836,922 B1 | 9/2014 | Pennecot |
| 8,886,045 B2 | 11/2014 | Pederson |
| 8,890,773 B1 | 11/2014 | Pederson |
| 8,891,962 B2 | 11/2014 | Du |
| 8,902,076 B2 | 12/2014 | Pederson |
| 8,965,460 B1 | 2/2015 | Rao |
| 9,349,217 B1 | 5/2016 | Worley, III |
| 9,413,469 B2 | 8/2016 | Eden |
| 9,461,748 B2 | 10/2016 | Pederson |
| 9,473,248 B2 | 10/2016 | Yang |
| 9,571,625 B2 | 2/2017 | Kim |
| 9,654,163 B2 | 5/2017 | Pederson |
| 9,964,447 B2 | 5/2018 | Fadell |
| 10,251,243 B2 | 4/2019 | Pederson |
| 10,411,746 B2 | 9/2019 | Pederson |
| 10,763,909 B2 | 9/2020 | Pederson |
| 10,812,186 B2 | 10/2020 | Pederson |
| 10,932,337 B2 * | 2/2021 | Pederson ............ H04B 10/116 |
| 2002/0054411 A1 * | 5/2002 | Heminger ........... H04B 10/1123 |
| | | 398/156 |
| 2002/0060522 A1 | 5/2002 | Stam |
| 2002/0109892 A1 | 8/2002 | Seto |
| 2002/0163448 A1 | 11/2002 | Bachinski |
| 2002/0168958 A1 | 11/2002 | Ford |
| 2002/0181044 A1 | 12/2002 | Kuykendall, Jr. |
| 2003/0025608 A1 | 2/2003 | Pederson |
| 2003/0107748 A1 | 6/2003 | Lee |
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0212996 A1 | 11/2003 | Wolzien |
| 2003/0222587 A1 | 12/2003 | Dowling |
| 2004/0028349 A1 | 2/2004 | Nagasaka |
| 2004/0044709 A1 | 3/2004 | Cabrera |
| 2004/0101312 A1 | 5/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111533 A1 | 5/2005 | Berkman |
| 2005/0111700 A1 | 5/2005 | OBoyle |
| 2005/0128751 A1 | 6/2005 | Roberge |
| 2005/0169643 A1 | 8/2005 | Franklin |
| 2005/0231128 A1 | 10/2005 | Franklin |
| 2005/0243173 A1 | 11/2005 | Levine |
| 2005/0252984 A1 | 11/2005 | Ahmed |
| 2006/0012315 A1 | 1/2006 | McDonough |
| 2006/0039698 A1 | 2/2006 | Pautler |
| 2006/0054776 A1 | 3/2006 | Nishimura |
| 2006/0056855 A1 * | 3/2006 | Nakagawa ........... H05B 47/195 |
| | | 398/183 |

(56) References Cited

U.S. PATENT DOCUMENTS

| | | |
|---|---|---|
| 2006/0132382 A1 | 6/2006 | Jannard |
| 2006/0149813 A1 | 7/2006 | Janik |
| 2006/0192672 A1 | 8/2006 | Gidge |
| 2006/0193634 A1 | 8/2006 | Wang |
| 2006/0213731 A1 | 9/2006 | Lesesky |
| 2006/0238368 A1 | 10/2006 | Pederson |
| 2006/0239689 A1 | 10/2006 | Ashdown |
| 2006/0253598 A1 | 11/2006 | Nakamura |
| 2006/0262545 A1 | 11/2006 | Piepgras |
| 2006/0275040 A1 | 12/2006 | Franklin |
| 2007/0041732 A1 | 2/2007 | Oki |
| 2007/0086912 A1 | 4/2007 | Dowling |
| 2007/0098407 A1 | 5/2007 | Hebrank |
| 2007/0104239 A1 | 5/2007 | Koga |
| 2007/0110446 A1 | 5/2007 | Hong |
| 2007/0145915 A1 | 6/2007 | Roberge |
| 2007/0147843 A1 | 6/2007 | Fujiwara |
| 2007/0160373 A1 | 7/2007 | Biegelsen |
| 2007/0165244 A1 | 7/2007 | Yukhin |
| 2007/0195263 A1 | 8/2007 | Shimizu |
| 2007/0219645 A1 | 9/2007 | Thomas |
| 2007/0258718 A1 | 11/2007 | Furlong |
| 2007/0269219 A1 | 11/2007 | Teller |
| 2007/0285026 A1 | 12/2007 | Johler |
| 2007/0294029 A1 | 12/2007 | Dandrea |
| 2008/0044188 A1 | 2/2008 | Kagawa |
| 2008/0063404 A1 | 3/2008 | Broyde |
| 2008/0074872 A1 | 3/2008 | Panotopoulos |
| 2008/0128505 A1* | 6/2008 | Challa .............. H04W 4/02 235/462.13 |
| 2008/0129219 A1 | 6/2008 | Smith |
| 2008/0138077 A1 | 6/2008 | Stretton |
| 2008/0154101 A1 | 6/2008 | Jain |
| 2008/0170536 A1 | 7/2008 | Marshack |
| 2008/0214219 A1 | 9/2008 | Matsushima |
| 2008/0227463 A1 | 9/2008 | Hizume |
| 2008/0292320 A1 | 11/2008 | Pederson |
| 2008/0310850 A1 | 12/2008 | Pederson |
| 2009/0002265 A1 | 1/2009 | Kitaoka |
| 2009/0102396 A1 | 4/2009 | Petrucci |
| 2009/0129782 A1 | 5/2009 | Pederson |
| 2009/0157545 A1 | 6/2009 | Mobley |
| 2009/0226176 A1 | 9/2009 | Franklin |
| 2009/0262760 A1 | 10/2009 | Krupkin |
| 2009/0315481 A1 | 12/2009 | Zhao |
| 2009/0315485 A1 | 12/2009 | Verfuerth |
| 2010/0060194 A1 | 3/2010 | Furry |
| 2010/0111538 A1 | 5/2010 | Arita |
| 2010/0124412 A1 | 5/2010 | King |
| 2010/0142965 A1 | 6/2010 | Breyer |
| 2010/0188846 A1 | 7/2010 | Oda |
| 2010/0209105 A1 | 8/2010 | Shin |
| 2010/0270933 A1 | 10/2010 | Chemel |
| 2011/0006898 A1 | 1/2011 | Kruest |
| 2011/0007938 A1 | 1/2011 | Haynes |
| 2011/0018465 A1 | 1/2011 | Ashdown |
| 2011/0029897 A1 | 2/2011 | Russell |
| 2011/0037712 A1 | 2/2011 | Kim |
| 2011/0063522 A1 | 3/2011 | Karaoguz |
| 2011/0121754 A1 | 5/2011 | Shteynberg |
| 2011/0128384 A1 | 6/2011 | Tiscareno |
| 2011/0140612 A1 | 6/2011 | Mohan |
| 2011/0202151 A1 | 8/2011 | Covaro |
| 2011/0208963 A1 | 8/2011 | Soffer |
| 2011/0225611 A1 | 9/2011 | Shintani |
| 2011/0294465 A1* | 12/2011 | Inselberg .......... H04M 1/72463 455/410 |
| 2011/0305460 A1 | 12/2011 | Snyder |
| 2012/0138420 A1 | 6/2012 | Leibu |
| 2012/0179983 A1 | 7/2012 | Lemire |
| 2012/0183301 A1 | 7/2012 | Pederson |
| 2012/0202520 A1 | 8/2012 | George |
| 2012/0230696 A1 | 9/2012 | Pederson |
| 2012/0240196 A1 | 9/2012 | Bhagwat |
| 2012/0251100 A1 | 10/2012 | Rope |
| 2013/0015785 A1 | 1/2013 | Kamada |
| 2013/0094863 A1 | 4/2013 | Pederson |
| 2013/0145610 A1 | 6/2013 | Feri |
| 2013/0201316 A1 | 8/2013 | Binder |
| 2013/0221848 A1 | 8/2013 | Miesak |
| 2013/0229346 A1 | 9/2013 | Jungbauer |
| 2013/0229492 A1 | 9/2013 | Ose |
| 2013/0341062 A1 | 12/2013 | Paquin |
| 2014/0153923 A1 | 6/2014 | Casaccia |
| 2014/0213234 A1 | 7/2014 | Inselberg |
| 2014/0247907 A1 | 9/2014 | McCune |
| 2014/0284390 A1 | 9/2014 | Teng |
| 2014/0286644 A1* | 9/2014 | Oshima .............. H04B 10/11 398/118 |
| 2014/0341588 A1 | 11/2014 | Pederson |
| 2015/0078743 A1 | 3/2015 | Yang |
| 2015/0228419 A1 | 8/2015 | Fadell |
| 2016/0190807 A1 | 6/2016 | Wendt |
| 2017/0367164 A1 | 12/2017 | Engelen |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1205763 | 5/2002 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 6333403 | 12/1994 |
| JP | 8002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 0225842 | 3/2002 |

(56) References Cited

FOREIGN PATENT DOCUMENTS

| WO | 02073836 | 9/2002 |
| WO | 2007003037 | 11/2007 |

OTHER PUBLICATIONS

Akhavan et al., "High-Speed Power-Efficient Indoor Wireless Infrared Communication Using Code Combining—Part I," IEEE Trnsactions on Communications, vol. 50, No. 7, Jul. 2002, pp. 1098-1109.

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efficiency Takes-off at Honolulu International Airport, Spring 2008, pp. 1-13.

Jeffrey B. Carruthers, "Wireless Infrared Communications," Wiley Encyclopedia of Telecommunications, 2002.

Kahn et al., "Wireless Infrared Communications," Proceedings of the IEEE, vol. 85, No. 2, Feb. 1997, pp. 265-298.

Pacific Northwest National Laboratory: Demonstration Assement of Light-Emitting Diode (LED) Parking Lot Lighting, Phase 1, Jun. 2010, pp. 1-37.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

T. Komine and M. Nakagawa, Integrated System of White LED Visible-Light Communication and Power-Line Communication Integrated System of White LED Visible-Light Communication and Power-Line Communication, Toshihiko Komine, Student Member, IEEE and Masao Nakagawa, Member, IEEE Date 1, Feb. 2003 pp. 71-79.

Back et al. "The Virtual Chocolate Factory: Building a Real Wold Mixed-Reality System for Industrial Collaboration and Control". IEEE. (Year: 2010).

Mlkawi et al. "A new paradigm for Human-Building Interaction: the use of CFD and Augmented Reality". Automation in Construction. (Year: 2004).

\* cited by examiner

FUNCTION DISABLER DEVICE AND SYSTEM

CROSS-REFERENCE TO RELATED APPLICATIONS

This application is a continuation of U.S. patent application Ser. No. 16/601,183 filed Oct. 14, 2019, now U.S. patent Ser. No. 10/932,337 issued Feb. 23, 2021, which is a continuation of U.S. patent application Ser. No. 16/210,546 filed Dec. 5, 2018, now U.S. patent Ser. No. 10/448,472 issued Oct. 15, 2019, which is a continuation of U.S. patent application Ser. No. 15/233,282 filed Aug. 10, 2016, which claims the benefit of U.S. Provisional Patent Application Ser. No. 62/203,697 filed Aug. 11, 2015, which is incorporated by reference herein in its entirety.

FIELD OF THE INVENTION

The present invention in general relates to pulsed light communication and the use of pulsed light communication by individuals and/or organizations to improve security within designated areas.

BACKGROUND OF THE INVENTION

In the past individuals carrying personal electronic devices such as a cellular telephones or smart phones have been able to enter into areas where a minimum or higher level of security is desirable.

No device or procedure is known which would prevent an individual from using a personal electronic device to record images or sounds within an area where security is desired, with the exception of temporary confiscation of the personal electronic device.

A few of the many areas where security may be desirable include, but are not necessarily limited to, research and development laboratories, governmental installations, restrooms, locker rooms, dressing rooms, or health clubs to name a few, and/or locations within a business where sensitive, confidential, and/or proprietary business information is located. In addition, in certain government facilities sensitive or secret information may be present, necessitating additional security procedures to deter or prevent unauthorized recordings by individuals.

It should be noted that cellular telephones are not the only type of personal electronic devices which may provide an individual with the capability to make an undesirable or unauthorized recording. Additional personal electronic devices may include such items as laptop computers, tablets, cameras, and/or MP3 devices to name a few.

No device or system is known which may selectively disable or disengage targeted functionality of personal electronic devices, within certain areas where a minimum or higher level of security is desirable, which also permits an individual to maintain possession of the personal electronic device.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety. Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

In at least one embodiment the enablement or termination of targeted functionality of a personal electronic device in a location where security is desired may be accomplished through the use of pulsed light communications. Enablement or termination of targeted functionality of a personal electronic device may be established by the downloading of a software application onto the personal electronic device establishing pulsed light communications capabilities. Electronic devices include, but are not necessarily limited to, telephones, cellular telephones, smart phones, tablets, computers, laptops, and/or other electronic devices as used by an individual.

In at least one embodiment a software application may be directly downloaded onto the personal electronic device from the global telecommunications network. Alternatively the software application may be downloaded onto the personal electronic device from a wired internet connection and/or wired or wireless communication with another electronic device, by reading a flash memory device, or by reading of a portable disk or another type of electronic storage media to name a few.

In at least one embodiment, the software application will enable the personal electronic device to communicate, transmit, and/or receive pulsed light communication signals or data as embedded within illumination carrying a pulsed light emitting diode light signal.

In some embodiments, the software application download onto the electronic device permits an individual to immediately become a customer of embedded pulsed light communication and/or data transfer network services. In some embodiments, the software application also includes recognition software which may include voice or sound recognition, facial recognition, or other biometric recognition for an individual.

In some embodiments a software application enables a customer to speak to the personal electronic device in order to initiate a transmission across the pulsed LED light communication/data system or network, similar to the use of a smart phone, substituting pulsed light communication for cellular transmissions or Wi-Fi transmissions.

In at least one embodiment the personal electronic device will include at least one camera or other photodetector having the capability to detect pulsed light communication signals. In some embodiments the personal electronic device will also include a light source having the capability to transmit pulsed light communication signals.

Alternatively, a supplemental optical transceiver may be attached to, or in communication with, the personal electronic device to enable pulsed light communications. The supplemental optical transceiver may include at least one camera or other photodetector, and/or an optional focusing element, where the photodetector has the capability to detect pulsed light communication signals. The supplemental optical transceiver may also include a light source having the capability to transmit pulsed light communication signals.

In some embodiments, the personal electronic device and/or the supplemental optical transceiver will also include sufficient features and software in order to recognize voice commands, audible signals or sounds, and/or commands communicated by transmission of a signal, including text or symbols.

In some embodiments the personal electronic device and/or the supplemental optical transceiver includes a processor which may electrically recognize a pulsed light communication signal, another electronic signal, a sound, or a light as converted into an electrical signal, in order to translate and communicate the information, data, or sounds within the signal to an individual. The processor may also encode a responsive communication signal for transmission through the light source, for transmission of a reply visible light communication, to establish a two-way duplex communication signals using visual light or embedded pulsed light communication.

It should be noted that in many embodiments that the visual light or embedded pulsed light communication described herein is comprised of a plurality of rapid flashes of light having a frequency which is not observable to the unaided eyes of an individual, where the rapid flashes of light may be organized into data packets and/or communications. The rapid flashes of light occur at a frequency which is also undetectable by the human eye. In addition, the wavelength of the visible light is not in the infrared spectrum which may cause physical damage to an individual's eyes.

In some embodiments a software application may be easily downloaded onto an electronic device through the use of embedded pulsed light communications or other downloading techniques. Upon completion of the software download onto a personal electronic device, an individual may immediately begin using pulsed light as a communication or data carrier medium for cellular telephone calls, text messaging, emails, or other types of communication. Embedded pulsed light communication provides augmented communication or data transmission, as an alternative to radio signal waves, Wi-Fi signals, Bluetooth communication signals and/or cellular communication signals as previously used by the identical personal electronic device.

In some embodiments, a photodetector and/or LED light source may be integral to the supplemental optical transceiver, and the supplemental optical transceiver may be releasably connected to a port of a personal electronic device in a manner similar to a portable credit card slide reader, which may be inserted into a port of a smart phone.

In some embodiments, a portable supplemental optical transceiver assembly having a photodetector and/or LED light source additionally includes suitable electronic circuitry to convert optical pulsed light signals into electrical signals. The portable supplemental optical transceiver assembly may be used to communicate, receive, and process embedded pulsed light signals. The portable supplemental optical transceiver assembly may be an additional piece of equipment or accessory for use by an individual.

In some embodiments, the supplemental optical transceiver assembly is constructed and arranged for connection to a port of a personal electronic device. The supplemental optical transceiver may include sufficient sensitivity and amplification capabilities, including transmitters, receivers, and LED drivers, to establish and maintain connectivity, communication, and data transmission through an embedded pulsed visible light communication network.

In some embodiments, a facility administrator, retail provider, school administrator, or property owner to name a few, which will be referred collectively to as a hosting customer, may automatically download, or assist in the downloading of a customized hosting customer software application onto a personal electronic device of a visitor, employee, contractor, or other individual who is present within the hosting customer facility or location.

In some embodiments, the customized hosting customer software application on the personal electronic device may automatically limit or restrict features of the electronic device or smart phone when the personal electronic device is located within certain designated locations within a facility. One or more functions of the personal electronic device may be disabled by the customized hosting customer software application when the personal electronic device is located within a secure area, a restroom, a research and development laboratory, a bookkeeping location, and/or other locations within a hosting customer facility.

In some embodiments, the termination, limitation and/or restriction of access to one or more components of a personal electronic device within certain designated areas of a hosting customer facility may be particularly important in sensitive governmental locations.

In some embodiments in certain areas or locations within a facility or structure of a hosting customer, the illumination within the area or location also include embedded pulsed light communications or signals.

In some embodiments the embedded pulsed light communications or signals as broadcast from an light emitting diode light source will broadcast command signals to be received by the photodetector, detector, or receiver of the personal electronic device and processed by the customized hosting customer software application, which in turn will temporarily disable a function or component of the personal electronic device. The component of the personal electronic device may be a camera, a voice recording function, a video recording function, or an audio or visual file transfer to name a few of the many functions which may be disabled, thereby preventing an unauthorized photograph or recording.

In some embodiments, the feature or function disable command or signal as transmitted by embedded pulsed light signals within illumination and as received by the personal electronic device, may prohibit a live cellular phone connection or conversation, text message, and/or email communication in certain restricted or prohibited areas of a hosting customer facility. In some embodiments, a personal electronic device may therefore not be used as a recording or surveillance tool or device.

In some embodiments the disable transmission feature may be communicated to a personal electronic device through a supplemental optical transceiver assembly. In other embodiments the disable transmission feature may be received by the personal electronic device by detection of the embedded pulsed light communication signal by the integral camera or photodetector on the personal electronic device.

In some embodiments the disabled transmission feature as communicated to a personal electronic device will be automatic when the device enters into a designated area, and may not be immediately recognized or recognizable by an individual.

In certain embodiments, the disable transmission feature as communicated to the personal electronic device will prohibit the initiation and/or the operation of components or features which have been disabled, such features or components including, be not being necessarily limited to, a camera, microphone, a video recorder, or other recorder function or mechanism preventing recording and transmission of images and/or sound recordings.

In some embodiments the connectable supplemental optical transceiver assembly may be reduced in size dimensions to the size of a postage stamp or credit card swipe or reader. In some embodiments the connectable supplemental optical transceiver may include a connection member, for interface and/or insertion into a receiving port of a personal electronic device such as a smart or cellular telephone.

In some embodiments, the connectable supplemental optical transceiver may include equipment and/or devices such as LED's, cameras, microphones, recorders, photodetectors or flashing illumination sources to name a few.

In some embodiments the supplemental optical transceiver may be used to amplify and/or to be temporarily attached to personal electronic devices or equipment, which would enhance a desired feature or capability of the personal electronic device. For example, a supplemental optical transceiver may include electrical components to focus and enhance available lighting functions of the personal electronic device to improve performance of a camera.

In an alternative embodiment, a focusing element may be used to enhance or amplify receipt of light transmitted from a remote location as detected by the photodetector. Alternatively, the supplemental optical transceiver may include a more robust camera capable of capturing images having an enhanced resolution.

In other embodiments, the supplemental optical transceiver may include LED light illumination sources to enhance the flash capabilities of the electronic device to improve camera functionality.

In some embodiments, any number of supplemental optical transceivers may be provided, having unique functionality of components or features which may be readily interchangeable by an individual dependent upon the requirements of a particular situation or environmental condition. In some embodiments the supplemental optical transceiver will include a single function enhancement capability. In other embodiments the supplemental optical transceiver will include more than one function enhancement capability.

In alternative embodiments, the supplemental optical transceiver may include one or more software applications in order to permit an individual to easily adjust the performance of the components or features of the supplemental optical transceiver.

In some embodiments an individual may desire to enhance the performance of an electronic device to increase the effective signal transmission or reception capabilities. In some embodiments, an individual may employ the use of a supplemental transmission/reception amplification device which may be an accessory, which is plugged into a port of the electronic device. In some embodiments, the supplemental transmission/reception device will augment the capabilities of the electronic device such as a cellular telephone or smart phone.

In some embodiments the supplemental transmission/reception device may include an electronic cord and/or detector for interface with a port of an electronic device to establish an electrical transfer link between the supplemental transmission/reception device and electronic device.

In some embodiments, the supplemental transmission/reception device enhances the performance of the engineering limitations or capabilities of the electronic device. In some embodiments the supplemental transmission/reception device includes an electrical power source or battery.

In some embodiments, the supplemental transmission/reception device may appear and be of the approximate size of a periscope pencil eraser which includes one or more focusing mirrors which project upwardly instead of straight out from an electric device. In alternative embodiments, the supplemental transmission/reception device may include a focusing lens.

In some embodiments, the supplemental optical transceiver is not restricted to the use of LED lighting elements, cameras, photodetectors, microphones, recorders, video recorders, or other devices, and may additionally include an almost infinite variety of devices or functionalities including magnetic strip readers, credit card readers, voice or facial recognition features, retinal scanners or fingerprint scanners to name a few.

In some embodiments, the functionality or sensitivity of a component of a personal electronic device, such as a camera, may be satisfactory. However, a need may arise for an enhanced photodetector or photodiode component, flash, or other lighting component, to provide focused illumination or focused collection of illumination including the embedded pulsed LED light communication signals or data.

In some embodiments, environmental conditions may necessitate the use of an enhanced or focused transmission or receiving capabilities for a photodetector, photodiode or LED transmission elements or components of a personal electronic device or for use of a supplemental optical transceiver.

In some embodiments the supplemental optical transceiver may be attached to the back, or about the perimeter of, a personal electronic device, to provide a streamlined appearance while simultaneously enhancing the functionality and/or flexibility of the electronic device.

In some embodiments any number of different supplemental optical transceivers may be utilized with a personal electronic device, each supplemental optical transceiver having unique performance considerations which may be used to enhance the flexibility, performance and/or utility of an electronic device to an individual.

In some embodiments an electronic device such as a cellular telephone includes a light emitting diode as a light source and/or flash diode. The software application providing embedded pulsed light communication to the personal electronic device may also enhance the capabilities of the electronic device to include flash recognition and transmission features.

In some embodiments, a bubble reflective surface may be positioned proximate to, or in covering relationship over, the LED light source and/or flash diode. The bubble or other reflective device may focus light emitted from the light emitting diodes for use of the embedded pulsed light communication/data transfer system. In some embodiments the bubble or other reflective device may focus light in an upward direction as opposed to a diffuse transmission direction.

In some embodiments, a reflective or focusing surface may be disposed proximate to a camera which may snorkel along the side or back of the electronic device to the top, or to another location on the electronic device, to enhance the performance of the detection capabilities of the camera to receive illumination and/or embedded pulsed light communication signals, which may include data transmissions.

In some embodiments, the transmission of recorded voice or sounds, as communicated over an embedded pulsed light communication signal may occur at relatively low transmission rates or speeds. In some embodiments the transmission of text messages may also generally occur at a low transmission rate or speed.

In some embodiments, alternative configurations of supplemental transmission/reception devices may be used to enhance the performance capabilities of an electronic device to provide a desired communication or transmission speed or rate. For example, transmission of text messages, or surfing the Internet, may require devices having different configurations to provide the desired level of performance.

In some embodiments, the supplemental transmission/reception device is plugged into a port of an electronic device such as a cellular telephone or smart phone in order to provide high-speed communications and data transfer. In some embodiments the configuration of the supplemental transmission/reception device enhances the sensitivity of a photodiode and/or the camera as incorporated into the electronic device.

In some embodiments, the supplemental transmission/reception device used to augment performance of an existing function of an electronic device may be releasably secured to the side, back, top, or bottom of the electronic device.

In some embodiments, the supplemental transmission/reception device will be constructed and arranged to be plugged into the electronic device as an accessory.

In some embodiments the supplemental transmission/reception device may be integral to the electronic device or may be incorporated into a protective case, cover or carrier for the electronic device.

In a first alternative embodiment, a function disabler system comprises a personal electronic device, the personal electronic device comprising at least one component, the personal electronic device further comprising a processor comprising pulsed light communication software, the pulsed light communication software being constructed and arranged to enable receipt and transmission of pulsed light communication signals, the pulsed light communication signals having a wavelength in the visible spectrum, the processor further comprising hosting customer software, the at least one pulsed light communication signals comprising an instruction signal, the hosting customer software being constructed and arranged to process the instruction signal, where the hosting customer software processes the instruction signal and disables the at least one component when the personal electronic device is positioned in a designated secure area.

In a second alternative embodiment according to the first embodiment, the at least one component is selected from the group consisting of a camera, microphone, speaker, photodetector, light source, LED light source, text message communication device, video recording device, and audio recording device and combinations thereof.

In a third alternative embodiment according to the second embodiment, the function disabler system further comprises a supplemental optical transceiver.

In a fourth alternative embodiment according to the third embodiment, the personal electronic device further comprises a receiving port.

In a fifth alternative embodiment according to the fourth embodiment, the supplemental optical receiver further comprises a connection member.

In a sixth alternative embodiment according to the fifth embodiment, the supplemental optical transceiver comprises a supplemental receiving port.

In a seventh alternative embodiment according to the sixth embodiment, the function disabler system further comprises a supplemental transmission device and the supplemental transmission device comprises a supplemental connection member which is constructed and arranged for engagement to the supplemental receiving port.

In an eighth alternative embodiment according to the third embodiment, the supplemental optical transceiver further comprises a focusing element.

In a ninth alternative embodiment according to the third embodiment, the function disabler system further comprises a supplemental transmission device.

In a tenth alternative embodiment, according to the ninth embodiment, the supplemental transmission device comprises an electrical cord.

In an eleventh alternative embodiment according to the tenth alternative embodiment, the electrical cord is resiliently flexible.

In a twelfth alternative embodiment according to the second alternative embodiment the personal electronic device further comprises a focusing element.

In a thirteenth alternative embodiment according to the twelfth alternative embodiment, the personal electronic device comprises a back, a side, and a top, wherein the supplemental optical transceiver is engaged to one of the back, the side, and the top of the personal electronic device.

In a fourteenth alternative embodiment according to the first alternative embodiment the function disabler system further comprises a supplemental transmission device.

In a fifteenth alternative embodiment according to the fourteenth alternative embodiment the supplemental transmission device comprises an electrical cord.

In a sixteenth alternative embodiment according to the fifteenth alternative embodiment the electrical cord is resiliently flexible.

In a seventeenth alternative embodiment according to the fourteenth alternative embodiment the supplemental transmission device comprises at least one supplemental component, the supplemental component being selected from the group consisting of a camera, microphone, speaker, photodetector, light source, LED light source, text message communication device, video recording device, and audio recording device and combinations thereof.

In an eighteenth alternative embodiment according to the second alternative embodiment the function disabler system further comprises at least one light emitting diode light fixture.

In a nineteenth alternative embodiment according to the eighteenth alternative embodiment the at least one light emitting diode light fixture generates the pulsed light communication signals and the instruction signal.

In a twentieth alternative embodiment according to the nineteenth alternative embodiment the at least one light emitting diode light fixture comprises a light fixture identifier, the light fixture identifier being embedded in the pulsed light communication signals or the instruction signal.

DETAILED DESCRIPTION OF THE PREFERRED EMBODIMENTS

In at least one embodiment, the function disabler device and system is indicated by the numeral 10. In some embodiments the function disabler device and system 10 is used with a personal electronic device 12. In general, the function disabler device and system 10 is used to terminate and/or disable a feature of the personal electronic device 12 when the personal electronic device 12 has been transported into an area or location where security is desired.

In general, the function disabler device and system 10 may be customized to target individual and select functions or features of a personal electronic device 12, which may be software programs stored within, or components of, the personal electronic device 12.

The function disabler device and system 10 also includes the use of an embedded pulsed light communication network/system generally referred to by the numeral 14.

The embedded pulsed light communication network/system 14 will be generally described herein, however, additional detail concerning the features, functions, components, and operation of a pulsed light communication network/system 14 are identified within the following United States patent applications and United States patents which are incorporated by reference herein in their entireties. The United States patent applications and United States patents incorporated by reference herein in their entireties include the following: Ser. Nos. 15/168,939; 15/076,093; 15/042,830; 15/005,305; 15/013,131; 15/042,843; 14/817,411; 14/597,648; 14/597,518; 14/557,705; 14/546,218; 14/537,470; 14/288,917; 14/290,152; 14/270,670; 14/207,934; 12/126,469; 12/126,647; 12/126,342; 12/032,908; 11/433,979; 62/203697; 61/927663; 61/927638; 61/867731; 61/819861; 61/778672; 61/165546; 61/432949; 60/931611; 60/322166; 60/248894; U.S. Pat. Nos. 9,265,112; 9,258,864; 9,294,198; 9,100,124; 9,246,594; 9,252,883; 9,363,018; 8,886,045; 8,751,390; 8,902,076; 8,593,299; 8,571,411; 8,331,790; 8,744,267; 8,543,505; 8,890,773; 8,188,879; 8,687,965; 8,188,878; 7,046,160; and 6,879,263.

In general, the function disabler device and system 10 begins with the downloading of a pulsed light interface software application generally referred to by reference numeral 16. The pulsed light interface software application 16 is downloaded onto the personal electronic device 12. Conventional downloading techniques including but not limited to the use of the global telecommunications network, a wired internet connection and/or wired or wireless communication with another electronic device, by reading a flash memory device, or by reading of a portable disk or another type of electronic storage media to name a few may be used to store the pulsed light interface software application 16 on the personal electronic device 12.

In general, the personal electronic device 12 may be any communication device including but not limited to telephones, cellular telephones, smart phones, tablets, computers, laptop computers, and/or other electronic devices as used by an individual.

In general, the downloading of the pulsed light interface software application 16 onto the personal electronic device 12 establishes connectivity and communication with the embedded pulsed light communication network/system 14.

In at least one embodiment, the pulsed light interface software application 16 will enable the personal electronic device 12 to communicate, transmit, and/or receive pulsed light communication signals or data 18 as embedded within illumination emitted from a light emitting diode light fixture 20.

In some embodiments, the pulsed light interface software application 16, as downloaded onto the personal electronic device 12, permits an individual to immediately become a customer of embedded pulsed light communication and/or data transfer network services. In some embodiments, the pulsed light interface software application 16 also includes recognition software, which may include voice or sound recognition, facial recognition, fingerprint, retinal, or other biometric recognition for an individual.

In some embodiments the pulsed light interface software application 16 enables a customer to speak to the personal electronic device 12 in order to initiate a transmission/communication across the pulsed LED light communication/data system or network 14, similar to the use of a smart phone, substituting pulsed light communication signals 18 for cellular transmissions or Wi-Fi transmissions.

In some embodiments, the function disabler device and system 10 utilizes a supplemental optical transceiver 22 which may be electrically connected to the personal electronic device 12.

In some embodiments the personal electronic device 12 and/or the supplemental optical transceiver 22 includes a processor which may electrically recognize a pulsed light communication signal 18, another electronic signal, a sound, or a light as converted into an electrical signal, in order to translate and communicate the transmission/communication to an individual. The processor may also encode a responsive communication signal for transmission through the light source, for either the personal electronic device 12 or supplemental optical receiver 22, for transmission of a reply visible light communication signal 18, to establish a two-way duplex communication using visual light or embedded pulsed light communication.

It should be noted that in many embodiments that the visual light or embedded pulsed light communication signals 18 described herein are comprised of a plurality of rapid flashes of light having a frequency which is not observable to the unaided eyes of an individual, where the rapid flashes of light may be organized into data packets and/or communications. The rapid flashes of light occur at a frequency which is not detectable by the human eye. In addition, the wavelength of the visible light is in the visible spectrum which functions as illumination. The wavelength of the visible light is not in the infrared spectrum, which may cause physical damage to the eyes of an individual.

In some embodiments, upon completion of the download of the pulsed light interface software application 16 onto a personal electronic device 12, an individual may immediately begin using pulsed light as a communication or data carrier medium for cellular telephone calls, text messaging, emails, or other types of communication. Embedded pulsed light communication provides augmented communication or data transmission, as an alternative to radio signal waves, Wi-Fi signals, Bluetooth communication signals and/or cellular communication signals as previously used by the identical personal electronic device 12.

In at least one embodiment the personal electronic device 12 will include at least one camera 24 or other photodetector 26 having the capability to detect pulsed light communication signals 18. In some embodiments the personal electronic device 12 will also include a light source 28 having the capability to transmit pulsed light communication signals 18.

In some embodiments, the supplemental optical transceiver 22 may be directly attached to, or in communication with, the personal electronic device 12 to enable pulsed light communications 18. The supplemental optical transceiver 22 may include at least one camera 24 or other photodetector 26, an LED light source 30, and/or an optional focusing element 32, where the photodetector 26 has the capability to detect pulsed light communication signals 18.

In some embodiments, the personal electronic device 12 and/or the supplemental optical transceiver 22 will also include sufficient features and software in order to recognize voice commands, audible signals or sounds, and/or commands communicated by transmission of a signal, including text or symbols.

In some embodiments, a photodetector 26 and/or LED light source 30 may be integral to the supplemental optical transceiver 22 which in turn may be releasably connected to a port 35 of a personal electronic device 12 in a manner similar to a portable credit card slide reader, as inserted into a receiving port 35 of device such as a smart phone.

In some embodiments, a portable supplemental optical transceiver 22 having a photodetector 26 and/or LED light source 30 may additionally include suitable electronic circuitry to convert optical pulsed light signals 18 into electrical signals. The portable supplemental optical transceiver 22 may be an accessory, and used in conjunction with the personal electronic device 12 to communicate, receive, and process embedded pulsed light signals 18.

In some embodiments, the supplemental optical transceiver 22 may include sufficient sensitivity and amplification capabilities, including transmitters, receivers, and LED drivers, to establish and maintain connectivity, communication, and data transmission through an embedded pulsed visible light communication network/system 14.

In some embodiments, a facility administrator, retail provider, school administrator, or property owner to name a few, which will be referred collectively to as a hosting customer 36, may automatically download, or assist in the downloading of a customized hosting customer software application 38 onto a personal electronic device 12 of a visitor, employee, contractor, or other individual who is present within the hosting customer facility or location.

In some embodiments, the customized hosting customer software application 38 on the personal electronic device 12 may automatically limit or restrict the operation of features of the electronic device 12, or smart phone, when the personal electronic device 12 is located within certain designated locations within a facility. One or more functions of the personal electronic device 12 may be disabled by the customized hosting customer software application 38 when the personal electronic device 12 is located within a secure area, a restroom, a research and development laboratory, a bookkeeping location, and/or other locations within a hosting customer facility.

In some embodiments, the customized hosting customer software application 38 is targeted to only disable the operation of certain components or functions of a personal electronic device 12 for a limited duration of time, when the personal electronic device is present within a restricted location.

In some embodiments, the pulsed light communication signals 18 may be formed of one or a plurality of data packets. Each packet or combination of signals may be assigned a character, number, or other information as data within memory which may be integral to a controller which in turn may be integral to a light emitting diode light fixture 20, or a personal electronic device 12, using the pulsed light interface software application 16. Individual packets of grouped embedded pulsed light signals may be combined into a message, word, and/or character for processing and/or translation by the pulsed light interface software application 16 on the personal electronic device 12, or the controller integral to the light emitting diode light fixture 20.

In some embodiments, any number of relay light emitting diode light fixtures 20 may be sequentially positioned between the communication system and the personal electronic device 12. Each pulsed light communication signal 18 may therefore be passed from the first LED light sources 28 of the first light emitting diode light fixture 20, to a second photodetector 26 integral to a second light emitting diode light fixture 20, for successive transmission to additional photodetectors 26 of subsequent light emitting diode light fixtures 20, for transmission to a final light emitting diode light fixture 20 which is proximate to a personal electronic device 12. The pulsed light communication signals 18 may therefore be processed sequentially through successive relay sites to a personal electronic device 12.

In this regard, each origin, intermediate, and final relay site or light emitting diode light fixture 20, as well as each personal electronic device 12, is required to have an individual, device specific, stored identifier which may be formed of one or more combinations of pulsed LED light signals, in order to identify a specific device or light fixture address. The addresses for each and every site, light emitting diode light fixture 20 and/or personal electronic device 12, may be stored within the memory for each respective controller.

In some embodiments, LVXR is the acronym for light visually transmitted repeater. The LVXR device will be used as a light signal repeater similar to that in radio repeater towers. A pulsed light communication signal 18 is received, processed for accuracy, routing, etc., and then rebroadcast/rerouted to the next light emitting diode light fixture 20 until the pulsed light communication signal 18 is proximate to the personal electronic device 12. Visual light will go into the LVXR device as packets, be compared with other identifiers, until there are at least two identical identifiers. If the two identifiers are not identical, then the pulsed light communication signal 18 will be sent out in the next step closer to a destination for proper routing. Each device or fixture will receive packeted data via embedded pulsed visual light form, along with other possible augmented communication mediums, in order to process the data packet and then pass the data packet and information to the next LVXR. This procedure will establish an embedded pulsed light communication system or network 14 from one location to another, for the rebroadcasting of embedded pulsed visual light signals 18 from one visual light transceiver to another, for the purpose of creating an optical data communication link over an appreciable, practical distance with accessibility along either all or part of the distance using visual light transmitting/receiving apparatus such as light emitting diode light fixtures 20.

In some embodiments, data may be sent from one location to another using a Global Positioning System (GPS) information as the data packet addressing information, hence connecting the data packet routing information to a geographic location instead of a cyber location. In some embodiments both a GPS address as well as a cyber address is utilized as identifiers in a data packet.

In some embodiments the incorporation of Global Positioning System (GPS) information into the data packet is similar to technology described in U.S. Pat. No. 4,785,463, the entire contents of which is expressly incorporated herein by reference. GPS positioning uses one or more coordinate systems, such as World Geodetic System 1984 (WGS84), to provide a reference frame, allowing every point on earth to be coded with a unique GPS location.

In some embodiments, a data packet may include GPS location header bits that include the packet's destination address in GPS coordinates. The data packet may further include GPS location trailer bits that include the packet's origin address in GPS coordinates. The data packet may further include the address in GPS coordinates of the optical transceiver that most recently transmitted the packet (the last known transmission address, or LTA), as will be described in more detail below. The data packet further includes the data to be transmitted, and may include any other bits of information determined to be necessary for successful transmission of data, such as error detection bits, as understood by a person of ordinary skill in the art.

Routing data packets from one location to another location can be accomplished using GPS location information which tags data packets having a geographic location instead of a cyber-location. Such an embodiment eliminates the need for any later geographic location translation because a data packet starts with geographic source and destination information. This simplifies locating the destination of the data packet.

In some embodiments, each data packet is assigned a GPS origin/destination address as it passes through the network infrastructure. The data packet is always searching for the next closest GPS address location. Each stationary (or static) optical transceiver, and some dynamic optical transceivers, within a network will be designated with a GPS location number. As a data packet passes through the network, it is routed by the optical transceivers, with their internal processors, to the next physically closer optical transceiver within the network. If another optical transceiver is within receiving range, or is connected with another form of communication medium, that optical transceiver receives the data packet. The optical transceiver's internal processor compares its internal GPS location address (ILA) to the data packet's GPS destination address and the optical transceiver's last known transmission address (LTA) stored within the data packet. If the ILA code is closer to the data packet destination address than the LTA code stored within the data packet, the optical transceiver's processor inserts its ILA code into the data packet as the new LTA code and then repeats transmission of the entire data packet with the updated LTA code.

The network continues this process until the data packet reaches the destination optical transceiver, at which point the data packet is transmitted to the personal electronic device 12.

This means each user of the embedded pulsed light communication network/system 14 may declare one or more static positions and have a dynamic position at any time. The system will track the identifier of the pulsed light interface software application 16 of the personal electronic device 12 as a user passes LVXRs, similar to that of cell phones in relation to their towers. Each user of the embedded pulsed light communication network/system 14 may determine at any point what his/her static address is. A static address may be an office, a home, the living room, or other room. When a user leaves his/her static address to traverse through the infrastructure, he/she then becomes dynamic. If a packet of data is transmitted to his or her static address, it will then be informed as to where his/her dynamic address is by using similar schemes as that of cell phones.

In some embodiments, a hosting customer 36 may program a customized hosting customer software application 38 to be embedded within one or more pulsed light communication signals 18, for downloading onto a personal electronic device 12. The downloading of the hosting customer software application 38 onto the personal electronic device 12 may be automatic. In some embodiments, within a restricted area the hosting customer software 38 will issue an instruction or command signal as embedded within one or more pulsed light communication signals 18, to communicate a feature/function disabling communication 40. A hosting customer 36 will be able to identify the applicable light emitting diode light fixtures 20 within the restricted area through the unique and individual device identifiers associated with fixture.

In some embodiments, the light emitting diode light fixtures 20 within a restricted area will continuously be emitting the feature/function disabling communication 40 as embedded within illumination for receipt by the hosting customer software application 38 on the personal electronic device 12. The receipt by the personal electronic device 12 of the feature/function disabling communication 40 will terminate the operation and/or use of a feature such as a camera, microphone, texting function, or recording function to name a few within the restricted area.

In some embodiments, when a personal electronic device 12 is transported out of a restricted area the pulsed light communication signals 18 as embedded within illumination will not include the feature/function disabling communication 40, whereupon the features/functions such as the camera, microphone, texting messaging function, or recording function will return to an active status for use by an individual.

The component of the personal electronic device 12 being disabled may also be a voice recording function, a video recording function, an audio or visual file transfer, a live cellular phone connection or conversation, and/or an email communication may be prohibited to name a few of the many functions which may be disabled, thereby preventing an unauthorized photograph, recording, or communication.

Many other types of components, functions, or features of an electronic device 12 may be disabled in addition to the components, functions, or features identified herein. In some embodiments, a personal electronic device 12 may therefore not be available for use as a recording or surveillance tool or device by an individual.

It should be noted that the features, functions, or operation of the personal electronic device 12 in some embodiments will only be disabled when the personal electronic device 12 is present within a restricted or secure area within a hosting customer 36 facility.

In some embodiments, the enablement or termination of targeted functionality of a personal electronic device 12 may be established and/or regulated by the feature/function disabling communication 40 as programmed within the customer hosting software application 38.

In some embodiments, the termination, limitation and/or restriction of access to one or more components of a personal electronic device 12 within certain designated or restricted areas of a hosting customer facility may be particularly important in sensitive governmental locations.

In some embodiments, embedded pulsed light communications or signals 18 will continue to be emitted by light emitting diode light fixtures 20 which are located within certain restricted areas or locations of a facility or structure of a hosting customer 36. In some embodiments, the personal electronic device 12 may continue to receive information and/or embedded pulsed light communication signals 18 within the restricted area or location, however, transmission and/or recording of information, and the transmission of any communication or information as embedded pulsed light communication signals 18 may be prohibited within the designated restricted or secure area.

In some embodiments the embedded pulsed light communication or signals 18, as broadcast from an light emitting diode light fixture 20 may also include command signals to be received by the photodetector, detector, or receiver of the personal electronic device 12 and/or supplemental optical transceiver 22, as generated by the customized hosting customer software application 38.

In some embodiments the feature/function disabling communication 40 may be communicated to a personal electronic device 12 through a supplemental optical transceiver assembly 22. In other embodiments, the feature/function disabling communication 40 may be received by the personal electronic device 12 by detection of the embedded pulsed light communication signal 18 by a camera or photodetector which may be integral to the personal electronic device 12.

In some embodiments the feature/function disabling communication 40 as communicated to a personal electronic device 12 will be automatically received when the personal electronic device 12 enters into a restricted or secure area. In some embodiments an individual may not immediately recognize that a function/feature or operation of the personal electronic device 12 has been temporarily disabled or interrupted.

In some embodiments, the connectable supplemental optical transceiver assembly 22 may have any size dimension as desired and in some embodiments may have reduced size dimensions to be similar in size to a postage stamp or credit card swipe reader. In some embodiments, the connectable supplemental optical transceiver 22 may include a connection member 34, for interface and/or insertion into a receiving port 35 of a personal electronic device 12 such as a smart or cellular telephone.

In some embodiments, the connectable supplemental optical transceiver 22 may include equipment and/or devices such as LED's 30, cameras 24, microphones 46, recorders, photodetectors 26 or flashing illumination sources to name a few.

In some embodiments, the supplemental optical transceiver 22 may be used to amplify and/or to be temporarily attached to personal electronic device 12, which would enhance a desired feature or function of the personal electronic device 12. For example, a supplemental optical transceiver 22 may include electrical components to focus and enhance available lighting functions of the personal electronic device 12 to improve performance of a camera 24.

In an alternative embodiment, a focusing element 32 may be used to enhance or amplify receipt of light transmitted from a remote location as detected by the photodetector 26. Alternatively, the supplemental optical transceiver 22 may include a more robust camera 24 capable of capturing images having an enhanced resolution.

In other embodiments, the supplemental optical transceiver 22 may include LED light illumination sources 30 to enhance the flash capabilities of the personal electronic device 12 to improve camera functionality.

In some embodiments, any number of supplemental optical transceivers 22 may be readily interchangeable for use with a personal electronic device 12, where each supplemental optical transceiver 22 provides improved or unique functionality of components or features, dependent upon the requirements of a particular situation or environmental condition.

In alternative embodiments, the supplemental optical transceiver 22 may include one or more software applications in order to permit an individual to easily adjust the operational performance of the components or features of the personal electronic device 12.

In some embodiments an individual may desire to enhance the performance of a personal electronic device 12 to increase the effective signal transmission or reception capabilities. In some embodiments, an individual may employ the use of a supplemental transmission/reception amplification device 48, as an accessory, which is inserted into a receiving port 50 of the supplemental optical transceiver 22 or personal electronic device 12. In some embodiments, the supplemental transmission/reception amplification device 48 will augment the capabilities of the personal electronic device 12.

In some embodiments the supplemental transmission/reception amplification device 48 may establish and interface with a receiving port 50 in order to establish an electrical transfer link between the supplemental transmission/reception amplification device 48 and the supplemental optical transceiver 22 and/or personal electronic device 12. In some embodiments the supplemental transmission/reception amplification device 48 includes an electrical power source or battery.

In some embodiments, the supplemental transmission/reception amplification device 48 may be similar in appearance to, and be the approximate size of, a periscope pencil eraser which includes one or more focusing mirrors which project upwardly instead of horizontally from a personal electric device 12. In alternative embodiments, the supplemental transmission/reception amplification device 48 may include a focusing element or lens 32.

In some embodiments, the supplemental optical transceiver 22 is not restricted to the use of LED lighting elements 30, cameras 24, photodetectors 26, microphones 46, recorders, video recorders, or other devices, and may additionally include an almost infinite variety of devices or functionalities including magnetic strip readers, credit card readers, voice or facial recognition features, retinal scanners or fingerprint scanners to name a few.

In some embodiments, the supplemental optical transceiver 22, or the supplemental transmission/reception device 48 may be attached to a cover or protector, about the back, top or the perimeter of a personal electronic device 12, to provide a streamlined appearance while simultaneously enhancing the functionality and/or flexibility of the personal electronic device 12.

In some embodiments, a bubble reflective surface may be positioned proximate to, or in covering relationship relative to, the LED light source 30 and/or flash diode. The bubble or other reflective device may focus light emitted from the light emitting diodes 30 for use in the embedded pulsed light communication/data transfer network/system 14. In some embodiments the bubble or other reflective device may focus light in an upward direction as opposed to a diffuse transmission direction.

In some embodiments, alternative configurations of supplemental transmission/reception devices 48 may be used to enhance the operational performance capabilities of a personal electronic device 12 to provide a desired communication or transmission speed or rate. For example, transmission of text messages, or surfing the Internet, may require devices having different configurations to provide the desired level of performance.

In some embodiments, the focusing element 32 may be a reflector which may be conical, parabolic, or any other shape as desired by an individual to enhance the reception of signals by a photodetector 26 or to record images by a camera 24. The focusing element 32 will in some embodiments additionally enhance the transmission of light from a light source such as an LED light source 30.

In some embodiments, the focusing element 32 may be affixed to, or integral with, the personal electronic device 12.

In other embodiments the focusing element 32 may be directly connected to a personal electronic device 12 by attachment of the focusing element 32 to a personal electronic device 12 proximate to a photodetector 26, LED light source 30, and/or camera 24. In other embodiments, the focusing element 32 may be indirectly connected to the personal electronic device 12, by attachment of the connecting member 34 of the supplemental optical transceiver 22 and/or the supplemental transmission/reception amplification device 48 with the receiving port 35 of the personal electronic device 12.

In other embodiments, the connection member 34 may be engaged to one end of an electrical cord or connector 42 and the focusing element 32, supplemental optical transceiver 22 and/or the supplemental transmission/reception amplification device 48 may be engaged to the opposite end of the electrical cord/connector 42.

In some embodiments, the electrical cord/connector 42 comprises flexible, resilient shaping qualities which in turn may permit the electrical cord/connector 42 to function in a manner similar to a snorkel for manipulation into a desired shape and direction. In some embodiments, the electrical cord/connector 42 may be enclosed within a segmented metal sheath which permits repeated shaping and retention of the electrical cord/connector 42 in a desired configuration/position. It should be noted that many alternative mechanical elements may be used to provide the electrical cord/connector 42 with the resiliently flexible shaping qualities as will be apparent to a person of ordinary skill in the art. In addition, a sheath for the electrical cord/connector 42 is not required to be formed of metal and may be formed of alternative materials, composite materials, and combinations of materials provided that the essential functions, features, and attributes as described herein are not sacrificed.

In some embodiments, the electrical cord/connector 42 may include pivoting or rotational elements on either end or at any desire location there between to permit adjustable rotation of the focusing element 32, supplemental optical transceiver 22, or the supplemental transmission/reception amplification device 48 relative to the connection member 34. In some embodiments, the portion of the electrical cord/connector 42 adjacent to the focusing element 32, supplemental optical transceiver 22, and/or the supplemental transmission/reception amplification device 48 may include an adjustable, rotatable pivoting device or head to permit manipulation of a feature such as a photodetector 26, camera 24, light source 28, LED light source 30, focusing element 32, microphone 46 and/or speaker 44 to be manipulated into any desired direction. In some embodiments the electrical cord/connector 42 may permit an individual to grasp a component, the supplemental optical transceiver 22 and/or the supplemental transmission/reception amplification device 48 in order to point the same in any desired direction.

In some embodiments, the hosting customer software application 38 functions to temporarily interrupt and disable the initiation of a specific execute software command on the personal electronic device 12 for a designated component such as a camera 24, microphone 42, text message, cellular transmission, video recording, or other recording function to name a few.

In other embodiments, the hosting customer software application 38 alternatively or simultaneously may function to temporarily interrupt, terminate, and disable an active specific software command or function on the personal electronic device 12 for a designated component such as a camera 24, microphone 42, text message, cellular transmission, video recording or other recording function to name a few.

In some embodiments, the hosting customer software application 38 initiates a termination/disable command to an active function or component of a personal electronic device 12 overriding the internal personal electronic device 12 component or function internal software.

In some embodiments the hosting customer software application 38 does not override the entire personal electronic device 12 operating system, except to the extent that a capability or function of a prohibited component is temporarily blocked or terminated, preventing execution during the period of time when the personal electronic device 12 is located within a restricted area within a hosting customer facility.

It should be noted that the hosting customer software application 38 may be customized to block or terminate any type of feature or function of a personal electronic device 12 for a designated area. For example, in a restroom the camera 24 and video recording functions may be disabled leaving text messaging or cellular communications in an operational status. In a research and development laboratory video recording, camera 24, microphone 42, cellular telephone, and text messaging functions all may be disabled. Therefore, specific features and/or components of a personal electronic device 12 may be blocked or terminated dependent on the area of the hosting customer facility the personal electronic device 12 is located within.

Figures 1, 2, 3:
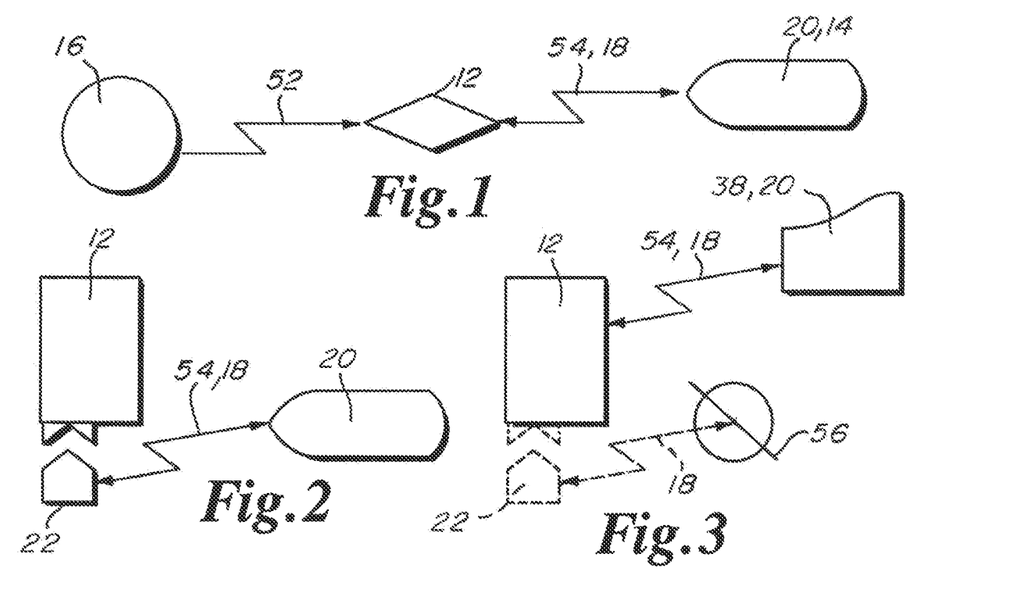
FIG. 1 depicts a block diagram of one alternative embodiment of the invention.
FIG. 2 depicts a block diagram of one alternative embodiment of the invention.
FIG. 3 depicts a block diagram of one alternative embodiment of the invention.

Referring to FIG. 1, in some embodiments, a personal electronic device 12 may receive a download represented by arrow 52, of a pulsed light interface software application 16 to provide the personal electronic device 12 with pulsed light communication capabilities designated by arrow 54. The pulsed light communication signals 18 are transmitted by the light emitting diode light fixture 20.

Referring to FIG. 2, in some embodiments, supplemental optical transceiver 22 is constructed and arranged for interface and electrical communication with a personal electronic device 12. Supplemental optical transceiver 22 may receive and may transmit pulsed light communication signals 18 as designated by arrow 54 to or from light emitting diode light fixture 20.

In some embodiments, FIG. 1 shows personal electronic device 12 in direct communication with an embedded pulsed light communication system 14 through a light emitting diode light fixture 20. In some embodiments, FIG. 2 shows supplemental optical transceiver 22 interfaced with personal electronic device 12 where supplemental optical transceiver 22 is in communication with an embedded pulsed light communication system 14 through a light emitting diode light fixture 20.

Referring to FIG. 3, in some embodiments, the personal electronic device 12 is in communication for transmission or receipt of pulsed light communication signals 18, represented by arrow 54, to and from hosting customer software application 38 as communicated from light emitting diode light fixture 20. In an alternative embodiment the supplemental optical transceiver 22 is shown in phantom line. In at least one embodiment as depicted in FIG. 3, the transmission of a pulsed light communication signal 18 representative of an impermissible recording, transmission or communication is blocked, as represented by line 56. The blockage of transmission 18 generally occurs within a processor including software as integral with personal electronic device 12 and/or supplemental optical transceiver 22. Alternatively, the disabling of the transmission 18 may occur within a processor including software as integral with supplemental transmission/reception amplification device 48.

Figure 4:
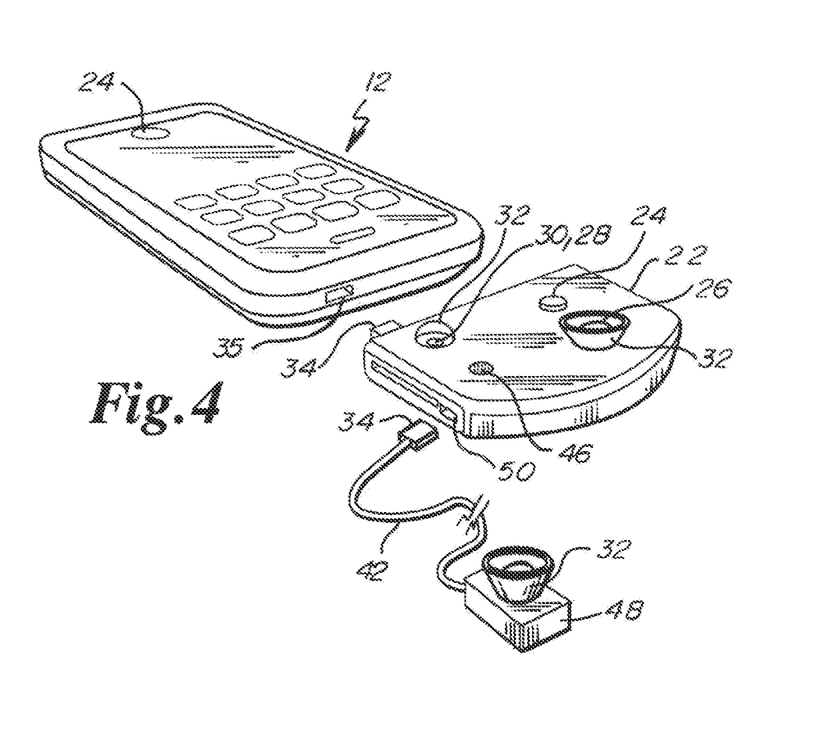
FIG. 4 depicts an isometric view of one alternative embodiment of a supplemental optical transceiver for engagement to a personal electronic device of the invention.

Referring to FIG. 4, in one embodiment, a supplemental optical transceiver 22 is shown for engagement with a personal electronic device 12. In addition, in one embodiment as depicted in FIG. 4 the supplemental transmission/reception amplification device 48 may be electrically coupled to the supplemental optical transceiver 22. Alternatively, the supplemental transmission/reception amplification device 48 may be directly connected to personal electronic device 12 by the interface of connection member 34 with receiving port 35.

Figure 5:
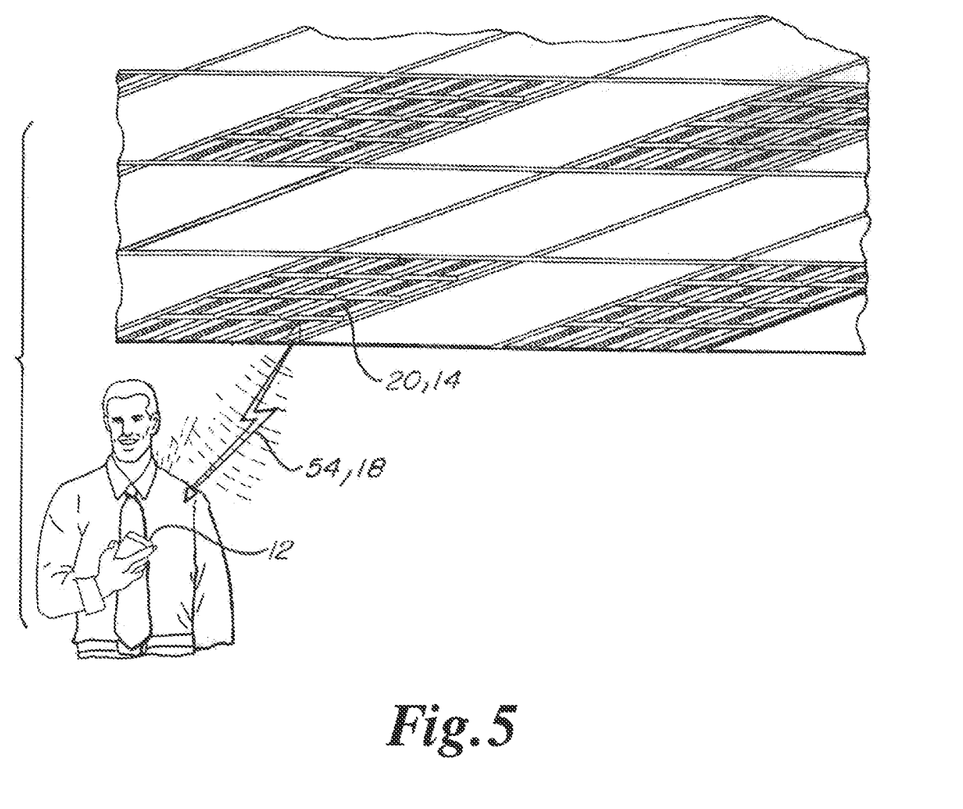
FIG. 5 depicts an environmental view of one alternative embodiment of the use of the invention.

Referring to FIG. 5, the at least one embodiment an individual holding a personal electronic device is shown communicating with the embedded pulsed light communication network/system 14 through the transmission of pulsed light communication signals 18 to and from an LED light fixture 20.

In a first alternative embodiment, a function disabler system comprises a personal electronic device, the personal electronic device comprising at least one component, the personal electronic device further comprising a processor comprising pulsed light communication software, the pulsed light communication software being constructed and arranged to enable receipt and transmission of pulsed light communication signals, the pulsed light communication signals having a wavelength in the visible spectrum, the processor further comprising hosting customer software, the at least one pulsed light communication signals comprising an instruction signal, the hosting customer software being constructed and arranged to process the instruction signal, where the hosting customer software processes the instruction signal and disables the at least one component when the personal electronic device is positioned in a designated secure area.

In a second alternative embodiment according to the first embodiment, the at least one component is selected from the group consisting of a camera, microphone, speaker, photodetector, light source, LED light source, text message communication device, video recording device, and audio recording device and combinations thereof.

In a third alternative embodiment according to the second embodiment, the function disabler system further comprises a supplemental optical transceiver.

In a fourth alternative embodiment according to the third embodiment, the personal electronic device further comprises a receiving port.

In a fifth alternative embodiment according to the fourth embodiment, the supplemental optical receiver further comprises a connection member.

In a sixth alternative embodiment according to the fifth embodiment, the supplemental optical transceiver comprises a supplemental receiving port.

In a seventh alternative embodiment according to the sixth embodiment, the function disabler system further comprises a supplemental transmission device and the supplemental transmission device comprises a supplemental connection member which is constructed and arranged for engagement to the supplemental receiving port.

In an eighth alternative embodiment according to the third embodiment, the supplemental optical transceiver further comprises a focusing element.

In a ninth alternative embodiment according to the third embodiment, the function disabler system further comprises a supplemental transmission device.

In a tenth alternative embodiment, according to the ninth embodiment, the supplemental transmission device comprises an electrical cord.

In an eleventh alternative embodiment according to the tenth alternative embodiment, the electrical cord is resiliently flexible.

In a twelfth alternative embodiment according to the second alternative embodiment the personal electronic device further comprises a focusing element.

In a thirteenth alternative embodiment according to the twelfth alternative embodiment, the personal electronic device comprises a back, a side, and a top, wherein the supplemental optical transceiver is engaged to one of the back, the side, and the top of the personal electronic device.

In a fourteenth alternative embodiment according to the first alternative embodiment the function disabler system further comprises a supplemental transmission device.

In a fifteenth alternative embodiment according to the fourteenth alternative embodiment the supplemental transmission device comprises an electrical cord.

In a sixteenth alternative embodiment according to the fifteenth alternative embodiment the electrical cord is resiliently flexible.

In a seventeenth alternative embodiment according to the fourteenth alternative embodiment the supplemental transmission device comprises at least one supplemental component, the supplemental component being selected from the group consisting of a camera, microphone, speaker, photodetector, light source, LED light source, text message communication device, video recording device, and audio recording device and combinations thereof.

In an eighteenth alternative embodiment according to the second alternative embodiment the function disabler system further comprises at least one light emitting diode light fixture.

In a nineteenth alternative embodiment according to the eighteenth alternative embodiment the at least one light emitting diode light fixture generates the pulsed light communication signals and the instruction signal.

In a twentieth alternative embodiment according to the nineteenth alternative embodiment the at least one light emitting diode light fixture comprises a light fixture identifier, the light fixture identifier being embedded in the pulsed light communication signals or the instruction signal.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

I claim:

1. A function disabler system comprising:
   a) a personal electronic device, said personal electronic device comprising a memory, a personal device processor, and at least one communication capability, said memory receiving pulsed light communication software, said personal device processor generating at least one personal device pulsed light transmission signal, said at least one personal device pulsed light transmission signal being emitted in a wavelength in the visible spectrum, said wavelength in the visible spectrum comprising a plurality of rapid flashes of light, said rapid flashes of light having a frequency which is not observable to an individual, said at least one personal device pulsed light transmission signal comprising a personal device signal identifier;
   b) a supplemental optical transceiver, said supplemental optical transceiver being releasably connectable to, and in communication with, said personal electronic device, said supplemental optical transceiver comprising at least one supplemental transceiver light emitting diode in communication with said personal device processor and at least one supplemental transceiver photodetector in communication with said personal device processor, said at least one supplemental transceiver photodetector being constructed and arranged for receipt of at least one pulsed received light communication signal and said at least one supplemental transceiver light emitting diode being constructed and arranged to generate said at least one personal device pulsed light transmission signal, said at least one pulsed received light communication signal being in a wavelength in the visible spectrum, said wavelength in the visible spectrum comprising a plurality of rapid flashes of light, said rapid flashes of light having a frequency which is not observable to an individual, said at least one pulsed received light communication signal comprising a destination signal identifier and an origin signal identifier, said at least one pulsed received light communication signal being communicated to said personal device processor; and
   c) a hosting customer facility, said hosting customer facility having at least one area, said at least one area having a plurality of facility optical transceivers, each of said facility optical transceivers having a plurality of facility light emitting diodes, a facility optical transceiver memory, at least one facility optical transceiver photodetector and a facility optical transceiver processor, said facility optical transceiver memory having a pulsed hosting customer communication signal, said pulsed hosting customer communication signal having hosting customer facility function disabling software and a hosting customer facility instruction signal, said pulsed hosting customer communication signal being in a wavelength in the visible spectrum, said wavelength in the visible spectrum comprising a plurality of rapid flashes of light, said rapid flashes of light having a frequency which is not observable to an individual;
   wherein at least one of said plurality of facility optical transceivers transmit said pulsed hosting customer communication signal for receipt by said supplemental optical transceiver located within said at least one area and wherein said hosting customer facility instruction signal activates said hosting customer facility function disabling software within said at least one area disabling said at least one communication capability within said at least one area, when said personal electronic device is located in said at least one area.

2. The function disabler system according to claim 1, said at least one pulsed received light communication signal further comprising a last transmission address signal identifier.

3. The function disabler system according to claim 2, said at least one personal device pulsed light transmission signal further comprising a personal device signal location identifier.

4. The function disabler system according to claim 3, wherein at least one of said facility optical transceivers receives said at least one personal device pulsed light transmission signal.

5. The function disabler system according to claim 4, wherein said facility optical transceiver processor stores said personal device signal location identifier on said facility optical receiver memory.

6. The function disabler system according to claim 5, said personal electronic device further comprising a receiving port.

7. The function disabler system according to claim 6, said supplemental optical transceiver further comprising a connection member releasably engaged to said receiving port.

8. The function disabler system according to claim 7, said supplemental optical transceiver further comprising a focusing element.

9. The function disabler system according to claim 2, wherein each of said facility optical transceivers has a facility optical transceiver identifier, said facility optical transceiver identifiers being embedded in said pulsed hosting customer communication signal or said hosting customer facility instruction signal.

10. The function disabler system according to claim 9, said function disabler system further comprising at least one relay optical transceiver, said at least one relay optical transceiver having at least one relay optical transceiver processor, a plurality of relay light emitting diodes in communication with said at least one relay optical transceiver processor, and at least one relay optical transceiver photodetector in communication with said at least one relay optical transceiver processor, said at least one relay optical transceiver photodetector being constructed and arranged for receipt of said at least one pulsed received light communication signal, wherein said at least one pulsed received light communication signal and said at least one personal device pulsed light transmission signal include packets of data, said at least one relay optical transceiver processor having a relay optical transceiver location identifier, said at least one relay optical transceiver processor comparing said destination signal identifier to said relay optical transceiver location identifier, said at least one relay optical transceiver processor replacing said last transmission address signal identifier with said relay optical transceiver location identifier as an updated last transmission address signal identifier when said destination signal identifier is different from said relay optical transceiver location identifier, and re-transmit said at least one pulsed received light communication signal, or accepts said at least one pulsed received light communication signal when said destination signal identifier is the same as said relay optical transceiver location identifier.

11. The function disabler system according to claim 1, said at least one communication capability having at least one component, said at least one component being selected from a group consisting of a camera, a microphone, a speaker, a light source, a video recording device, and an audio recording device and combinations thereof.

12. The function disabler system according to claim 11, said hosting customer facility having at least one second area, said at least one second area having a plurality of said facility optical transceivers, wherein at least one of said plurality of facility optical transceivers located in said at least one second area transmit said pulsed hosting customer communication signal for receipt by said supplemental optical transceiver located within said at least one second area and wherein said hosting customer facility instruction signal activates said hosting customer facility function disabling software within said at least one second area disabling said at least one communication capability within said at least one second area, when said personal electronic device is located in said at least one second area.

* * * * *